April 26, 1938.   L. S. SIMON   2,115,432
VENTILATING AND LIGHT CONTROLLING DEVICE FOR VEHICLES
Filed Oct. 14, 1936   2 Sheets-Sheet 1
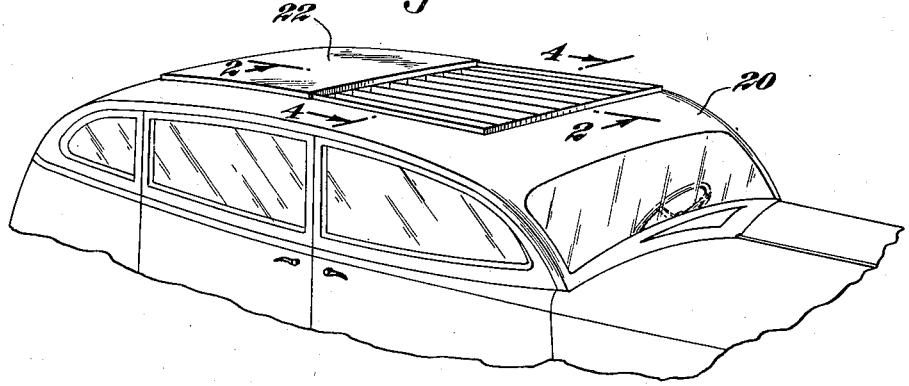
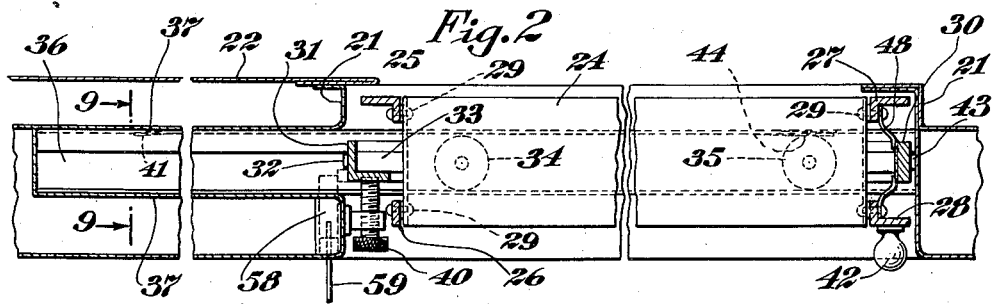
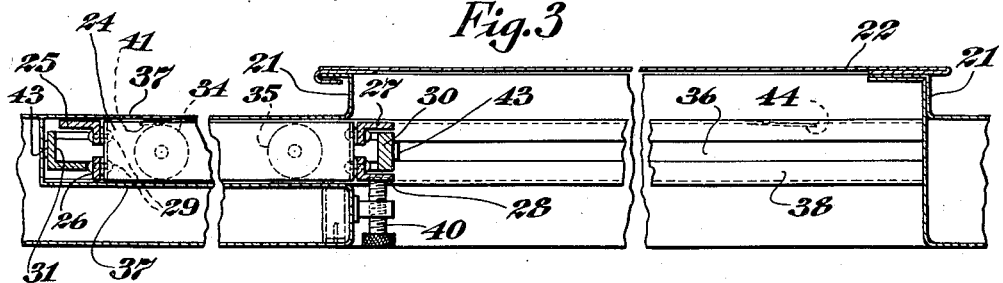
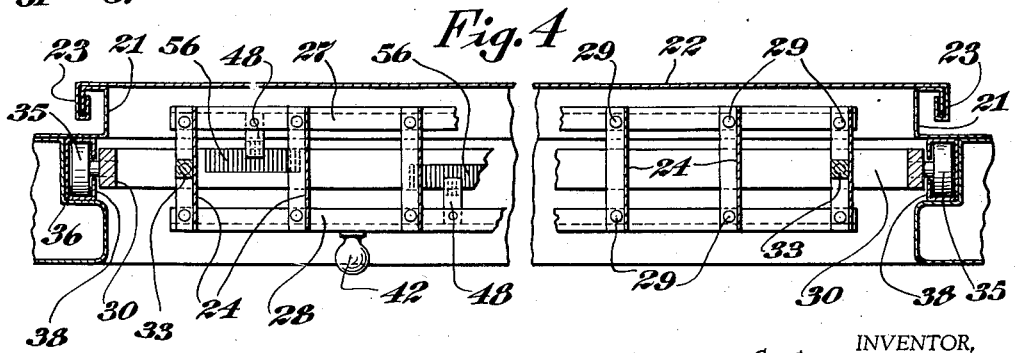
INVENTOR,
Lester S. Simon,
BY Frederick Freitenfeld
ATTORNEY.

April 26, 1938.      L. S. SIMON      2,115,432
VENTILATING AND LIGHT CONTROLLING DEVICE FOR VEHICLES
Filed Oct. 14, 1936      2 Sheets-Sheet 2
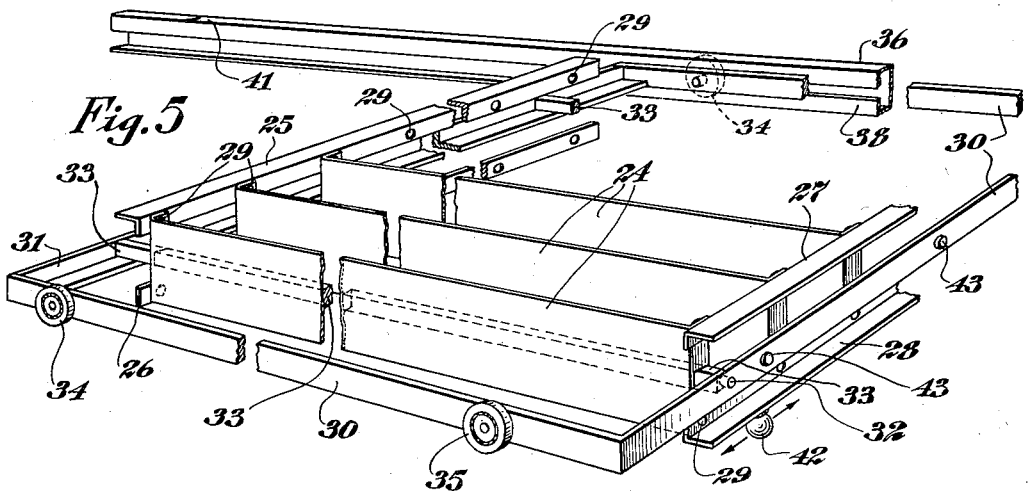
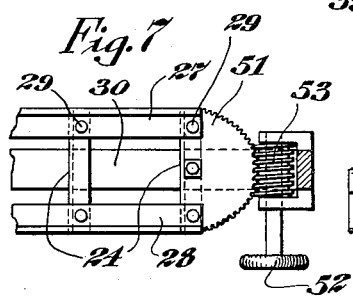
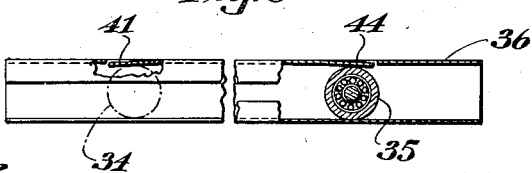
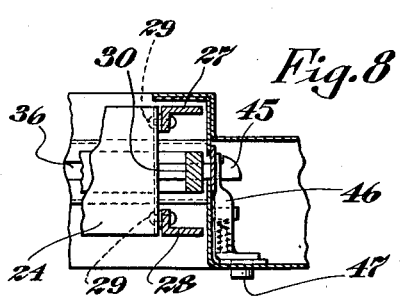
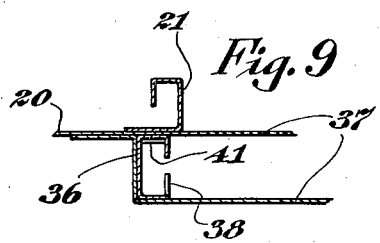
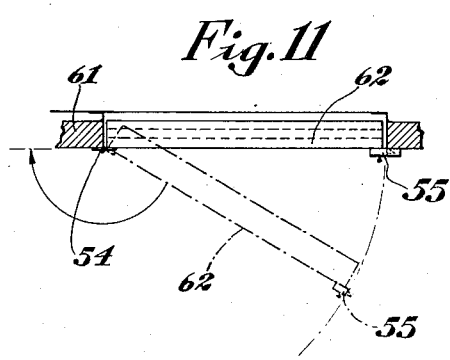
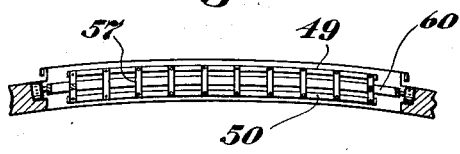
INVENTOR,
Lester S. Simon,
BY Frederick Breitenfeld
ATTORNEY.

Patented Apr. 26, 1938

2,115,432

UNITED STATES PATENT OFFICE 2,115,432

VENTILATING AND LIGHT-CONTROLLING DEVICE FOR VEHICLES

Lester S. Simon, Larchmont, N. Y., assignor to Vent-Lux Limited, New York, N. Y., a corporation of New York Application October 14, 1936, Serial No. 105,452

8 Claims. (Cl. 98—2)

My present invention relates generally to vehicles, and has particular reference to an improved ventilating and light-controlling device.

While my invention is primarily applicable to automobile bodies, and while I have for this reason illustrated herein an embodiment of the invention in association with an automobile body, nevertheless it will be understood that certain phases of my invention are not necessarily restricted to this specific type of use.

My invention contemplates the provision of a vehicle body in which the roof is provided with a substantial opening for ventilating purposes; and my invention is directed toward the provision of a thoroughly practical louver vane assembly for operative disposition within such roof opening.

My invention provides further for the provision of a vane assembly in which the vanes are pivotally interconnected, thereby permitting them to be tilted to various angles.

Furthermore, my invention provides an unusually efficient and practical means for adjusting the vane assembly, either by relative adjustments of the vanes themselves, or, preferably, by a movement of the vane assembly bodily into and out of operative position with respect to the roof opening, so that such opening may be entirely uncovered, if the user of the vehicle prefers to have it so.

It is a particular feature of my invention to provide a construction having, among others, the aforementioned capabilities of mechanical adjustment and movement, and being, nevertheless, capable of withstanding the jarring, jolting, and general strenuous wear to which it is subjected by virtue of its association with a vehicle top. Particular features of my invention reside, for example, in the provision of a means for permitting a rolling movement to take place without undue rattling; the arrangement of parts which permits a series of louver vanes to be adjusted relative to each other, and also moved bodily, without undesirable chattering; the provision of an arrangement for snugly accommodating the entire vane assembly when it is moved out of operation; and, in general, the arrangement and construction of parts which adapt the concept in an efficient and workmanlike manner to the peculiar and difficult requirements of a vehicle body roof.

I achieve the foregoing objects, and such other objects as may hereinafter appear or be pointed out, in the manner illustratively exemplified in the accompanying drawings, wherein—

Figure 1 is a perspective view of a typical car body roof embodying the features of my present invention;

Figure 2 is a fragmentary cross-sectional view taken substantially along the line 2—2 of Figure 1;

Figure 3 is a view similar to Figure 2, with the parts in different adjusted positions;

Figure 4 is a cross-sectional view taken substantially along the line 4—4 of Figure 1;

Figure 5 is a perspective view, with parts broken away for the sake of clearness, illustrating the main elements of the embodiment herein illustrated;

Figure 6 is a fragmentary detail view;

Figure 7 is a fragmentary cross-sectional view, illustrating a modification;

Figure 8 is a fragmentary cross-sectional view similar to the right-hand portion of Figure 2, illustrating a modification;

Figure 9 is a cross-sectional view taken substantially along the line 9—9 of Figure 2;

Figure 10 is a cross-sectional view similar to Figure 4, but on a greatly reduced scale, illustrating a modification; and Figure 11 is a longitudinal cross-section through a vehicle roof, on a diagrammatic scale, illustrating a further modification.

For the purpose of explaining the nature of my invention, I have chosen to illustrate a car body 20 provided at the forward portion of the roof with a substantially rectangular opening. Merely for purposes of illustration, I have shown this opening defined by upstanding flanges 21, and adapted to be closed by means of a slidable cover 22. In Figures 1 and 2, the cover 22 has been shown in a rearward position, leaving the opening in the roof open. In Figure 3, the cover 22 is shown in an advanced position in which the opening is intended to be closed. At the portions designated by the reference numerals 23 in Figure 4, I have shown one manner in which the cover 22 might be slidably associated with the roof for permitting the sliding movements referred to.

The cover 22 and the manner in which it is associated with the roof, either for sliding movement, pivotal movement, or otherwise, forms no part of my present invention, which is directed primarily to the louver vane assembly, and associated parts, as illustrated most clearly in Figure 5.

A series of spaced parallel vanes 24 are pivotally interconnected by means of the four members 25, 26, 27, and 28. Preferably, each vane is provided at its ends with transversely bent portions, these portions being pivotally connected or articulated to the members 25—28, at the points 29. This assembly of vanes and supporting members forms a unitary structure which will be referred to hereinafter, and in the appended claims, by the term "louver vane assembly".

This assembly is mounted in a rigid, substantially rectangular frame 30, three of whose sides are of substantially rectangular cross-section, while its rear side 31, for a purpose presently to be described, is of angular cross-section. The mounting of the vane assembly in the frame 30 may be accomplished in a variety of ways, but I prefer the employment of journals 32 projecting from the opposite ends of each end vane 24. Preferably, for the sake of rigidity, the journals 32 are formed as integral portions of a rod 33 which extends for the full length of the vane 24 and is secured to the latter by any suitable means.

In the preferred embodiment, the parts are so proportioned that when the vanes are tilted or collapsed into substantially overlapping relationship, the angles 27 and 28 will nest compactly with the forward end of the frame 30, as shown most clearly in Figure 3.

The frame 30, with the vane assembly carried thereby, is adapted to be moved bodily into and out of an operative relationship to the roof opening. In the embodiment herein illustrated, I have provided a pair of rollers 34 on the rear portion of the frame 30, and a second pair of rollers 35 on the forward portion. These rollers are adapted to move within a pair of C-shaped guide rails 36 arranged along opposite edges of the roof opening and extending substantially beyond the roof opening. Furthermore, the guide rails 36 are caused to extend into a housing 37 which is shown most clearly in Figures 2 and 3, and which is built into the roof structure. This housing is of a size which is just sufficient snugly to accommodate the frame 30 and the vane assembly when the vanes are in collapsed condition.

Under certain circumstances, the housing may be so designed, with respect to the width of the vanes, that the accommodation of the frame and the vane assembly could be effected without necessarily collapsing the vanes.

So that the receptacle or housing 37 may be readily cleaned, the channels 36, where they enter the housing 37, have the inner wall portion 38 cut away, as will be most clearly observed in Figure 9.

When the cover 22 is closed, and the vane assembly is in the inoperative position of Figure 3, snugly accommodated within the housing 37, a thumbscrew 40 is adapted to bear against the angle 28, preferably fitting into a specially provided recess in the angle 28, thereby locking the entire assembly against forward movement or up-and-down rattle. The rear or inner portion of the assembly is secured against rattling by the bent-in portions 41 of the rails 36 (see Figure 6) which frictionally engage the rollers 34 when the frame 30 is in its rearmost position.

When it is desired to utilize the vane assembly for ventilating purposes, the cover 22 is first withdrawn from the roof opening, and the thumbscrew 40 (or its equivalent) is released. This permits the user to grasp the device, preferably by means of a pair of knobs 42, and to pull the entire frame 30 forwardly. Rubber bumpers 43 are preferably provided to limit the forward movement of the frame 30. When the frame is in its extreme forward position, the wheels or rollers 35 engage the bent-in rail portions 44 (see Figure 6), whereby the forward portion of the frame 30 is frictionally held against rattling. At the same time, the angle portion 31 of the frame 30 positions itself over the thumbscrew 40, and a specially provided recess in the angle 31 permits the screw 40 to be tightened, as shown most clearly in Figure 2, thus securely locking the rear portion of the assembly against rattle and movement.

Obviously, one or more thumbscrews 40 may be employed, in the manner hereinbefore described, or any equivalent clamping, wedging, or latching device may be resorted to.

For example, in Figure 8 I have shown the manner in which a latch 45 may be caused to engage a spring-pressed keeper 46 when the frame 30 is advanced to its forward position, as shown in Figure 2. A button 47 serves as a release button to effect disengagement of the latch 45 when it is desired to move the frame 30 rearwards again.

After the assembly has been moved forwardly, as hereinbefore described, the knob or knobs 42 fulfill an added function, because by moving these knobs sideways, i. e., in the direction of the arrows of Figure 5, the vanes 24 may be tilted into desired angular positions.

Preferably, the pivotal movement is yieldably impeded so that the vanes may be set into and retained at any desired angle. With this object in view, I prefer to provide springy elements 48 on the angles 27 and 28, these elements being adapted to slide frictionally along roughened or knurled portions 56 on the frame 30. The knurled or roughened portions thus have an impeding effect which locks the angles 27 and 28 against inadvertent movement that might otherwise be caused by the jolting of the vehicle.

If it is desired to leave the vane assembly in operative position, with the car unoccupied, it may be found desirable to provide a deadlock 58 in association with the housing 37, so that it would be impossible for an intruder to break into the car or vehicle through the roof opening. I have designated the deadlock 58 in a purely diagrammatic manner, the same to be operated by a removable key 59, and being of any conventional character. I contemplate that anyone skilled in the art would be able to apply such a lock, to prevent retractive movement of the vane assembly by any unauthorized party.

Modifications in various details will readily suggest themselves. I have shown in Figure 7, for example, a modified way in which the angularity of the vanes may be adjusted. By pivotally securing a semi-circular gear segment 51 to the angles 27 and 28, it is possible, by means of a hand-wheel 52 and a worm 53, to effect a rotative movement of the segment 51 and thereby effect a tilting of the vanes 24. The arrangement of Figure 7 would obviate the necessity for the springy elements 48, or for any other yieldable means for impeding the pivotal movement, because the engagement between worm 53 and segment 51 constitutes in itself an efficient impedance which would lock the vanes in any desired angular position.

Viewing the entire assembly transversely, as in Figure 4, the members 25—28 may, if desired, be straight, or they may be slightly arched, as shown in Figure 10. If they are straight, then the exposed contour of the vane assembly is in the nature of a plane. If it is desired to conform this contour more accurately with the transverse contour of the vehicle roof, the members might be arched, as shown in Figure 10.

In Figure 10, I have designated the vanes by the reference numeral 57. They are pivotally interconnected by means of the arched members 49 and 50. The entire vane assembly is in turn supported in the rigid frame 60, the latter being correspondingly arched.

Figure 10, though on a very reduced scale, is adequate, in a diagrammatic way, to show the possibility of modifying the construction so as to comform more accurately to the curved contour of the vehicle roof.

In Figure 11, I have shown the possibility of mounting the entire vane assembly and frame in a hinged manner relative to the vehicle roof 61. By the reference numeral 62 I have designated, diagrammatically, the vane assembly and its supporting framework. This unit may be hinged, as at 54, to the vehicle top and may be provided with a latch arrangement 55 opposite the hinge, thereby permitting the entire vane assembly to be swung as a unit from the operative full-line position of Figure 11 rearwardly into an inoperative position, as indicated by the dot-and-dash lines and by the arrow.

While I have illustrated a vane assembly in which the vanes extend longitudinally with respect to the vehicle, it will be understood that a transverse arrangement of the vanes would be equally feasible. In such an event, the vanes would be journaled between the side portions of the frame 30 instead of between the end portions. Moreover, the vanes need not necessarily be mounted for tilting around a central axis. While the preferred embodiment herein illustrated shows a completely balanced vane assembly, in so far as the point of pivoting of the vanes is concerned, nevertheless the pivot points might be offset toward one or the other edge.

Furthermore, while I have illustrated a vane assembly in which the vanes are mounted in permanent spaced relationship to one another, it is within the purview of my invention to provide a vane assembly in which the vanes might be collapsed with respect to one another. In such an event, the bodily movement of the vane assembly might be dispensed with, and the roof opening might be covered or uncovered by simply adjusting the vanes relative to each other.

However, from the standpoint of compactness, workmanship, efficiency, staunchness, and noiseless operation, it is my opinion that the embodiment herein illustrated, with the various features herein described, is preferable.

In general, it will be understood that changes in the details herein described and illustrated, for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In a vehicle, a roof having an opening therein, a louver vane assembly, and means for moving the assembly as a unit into and out of operative relation to said opening.

2. In a vehicle, a roof having an opening therein, a louver vane assembly, means for moving the assembly as a unit into and out of operative relation to said opening, and a housing adapted to receive and accommodate said assembly when it is out of operation.

3. In a vehicle, a roof having an opening therein, a louver vane assembly comprising a series of pivotally interconnected vanes adapted to be collapsed into compact relation, means for moving the assembly as a unit into and out of operative relation to said opening, and a housing adapted snugly to accommodate said assembly with the vanes collapsed when it is out of operation.

4. In a vehicle, a roof having an opening therein, a louver vane assembly, and means for moving the assembly as a unit into and out of operative relation to said opening, said means comprising a rigid frame supporting said assembly, guide rails, and rolling means operatively interposed between the frame and rails.

5. In a vehicle, a roof having an opening therein, a louver vane assembly, a rigid frame supporting said assembly, a housing adapted snugly to accommodate said assembly, guide rails extending from the roof opening into said housing, and rolling means operatively interposed between said frame and rails, whereby the louver vane assembly may be moved as a unit from said housing into and out of operative relation to said roof opening.

6. In a vehicle, a roof having an opening therein, a louver vane assembly comprising a series of pivotally interconnected vanes adapted to be collapsed into compact relation, a rigid frame supporting said assembly, a housing adapted snugly to accommodate the assembly when the vanes are collapsed, guide rails extending from the roof opening into said housing, and rolling means operatively interposed between said frame and rails, whereby the louver vane assembly may be moved as a unit from said housing into and out of operative relation to said roof opening.

7. In a vehicle, a roof having an opening therein, a louver vane assembly, a rigid frame supporting said assembly, guide rails arranged along and beyond the roof opening, rolling means operatively interposed between said frame and rails, whereby the vane assembly may be moved as a unit along said rails to bring it into and out of operative relation to said opening, and means for frictionally impeding said rolling means when the frame is at either of its extreme positions.

8. In a vehicle, a roof having an opening therein, a louver vane assembly, a rigid frame supporting said assembly, guide rails arranged along and beyond the roof opening, rolling means operatively interposed between said frame and rails, whereby the vane assembly may be moved as a unit along said rails to bring it into and out of operative relation to said opening, and clamping means carried by the roof in the path of movement of said frame, said means being adapted to clamp said frame and vane assembly against movement in either of its extreme positions.

LESTER S. SIMON.